Patented Sept. 1, 1931

1,820,988

UNITED STATES PATENT OFFICE

LONNIE W. RYAN, OF NIAGARA FALLS, NEW YORK, ASSIGNOR TO TITANIUM PIGMENT COMPANY, INC., OF NEW YORK, N. Y., A CORPORATION OF MAINE

METHOD OF PRECIPITATING TITANIUM COMPOUNDS

No Drawing. Application filed March 27, 1928. Serial No. 265,214.

My present invention relates to titanium compounds and methods for their economical manufacture, which compounds have varied uses in the industrial arts, and more particularly relates to improved methods for the economical production of an essentially pure titanium oxide pigment with the practical exclusion of all undesired impurities, especially iron compounds, which pigment will be exceptionally white in color, and will also possess increased hiding power when compared with other pigments now in use. My improved pigment product is also characterized by exceptional fineness, smoothness and softness, which qualities render same highly useful and desirable when such products are employed as pigments in paints and for other purposes.

It is believed that the hiding power of titanium pigments is due, among other things, to the degree of dispersion of the individual particles. In the manufacture of composite pigments, i. e., those containing a base such as barium sulphate upon which the titanium compounds have been fixed, the hiding power has been developed to a high degree, apparently due to the dispersing effect of the base and its preventing aggregation of the precipitated titanium particles. Such methods of producing composite titanium oxide pigments are set forth in U. S. Louis E. Barton reissued Patent No. 14,289 of April 24, 1917 and in U. S. Louis E. Barton Patent No. 1,409,648 of March 14, 1922. Such bases contained in these composite titanium pigments may be termed insoluble dispersing agents.

I have discovered that, by using a mixture of an organic acid or an organic acid compound together with phosphoric acid or a phosphoric acid compound, in my preferred method of precipitation of titanium from a solution containing same, by hydrolysis, there can also be obtained a titanium oxide of great hiding power and excellent color. Furthermore, precipitations of such desired character may be made even from titanium solutions containing a greater proportion of impurities usually found in titanium ores.

My improved method of precipitation to produce this essentially pure titanium oxide consists in the slow mixing together of a mineral acid solution of titanium and a hot dilute solution containing a mixture of an organic acid or organic acid compound and phosphoric acid or a phosphoric acid compound. Preferably this titanium solution is slowly added to the organic acid and phosphoric acid solution. As an alternative method the reagents may be added to the solution of titanium and this mixture is subsequently added to hot water.

In either case the resulting precipitate is filtered and washed or separated from its mother liquor by other means and calcined at a temperature of from 700° to 1000° C. The titanium oxide thus obtained is in a uniformly fine state of subdivision, of excellent color and hiding power with the particles uniformly dispersed throughout the final titanium oxide pigment product which may vary slightly with variation in condition of its preparation.

A typical analysis is as follows:—

| | |
|---|---|
| $TiO_2$ | 98.13% |
| $Fe_2O_3$ | Trace |
| $P_2O_5$ | 1.30% |
| Sulphuric anhydride | .22% |

Titanium oxide of great hiding power and excellent color may be produced by using both oxalic acid and phosphoric acid. These are not the only reagents which give satisfactory results but are named merely as an example. Other organic acids such as tannic, citric and tartaric acids and their compounds may be used together with phosphoric acid and phosphoric acid compounds to produce the same results.

Having described my improved product and briefly explained the general method of preparation, I shall now give in detail two examples, although I do not wish to be limited thereby. The examples are intended for illustrative purposes only, as the process is capable of considerable variation in yielding the product desired.

The most readily available titanium ore is ilmenite, or titaniferous iron ore, containing a maximum of 52.7% titanium oxide ($TiO_2$) and 47.3% ferrous oxide (FeO) corresponding to a formula $TiO_2$, FeO. Ilmenite usually contains small amounts of other oxides such as alumina, zirconia, silica, etc. Such an ore is brought into solution by any of the well known methods, such as, for example, by digestion with concentrated sulphuric acid and subsequent treatment with water.

Such a solution prepared by me and designated (A) is analyzed as follows:—

| | Per cent |
|---|---|
| Titanium oxide ($TiO_2$) | 5.71 |
| Ferrous oxide (FeO) | 5.24 |
| Alumina, zirconia, etc. ($Al_2O_3$, $ZrO_2$) | 0.66 |
| Sulphuric acid in combination | 23.81 |
| Uncombined sulphuric acid | 2.86 |

Before making the precipitation of titanium from such solution it is desirable to reduce all iron present in the solution to the ferrous condition. This reduction may be accomplished by any of the well known methods, such as by the introduction of metallic iron or zinc. In order to be sure that no ferric iron will be formed during precipitation I prefer to carry the reduction of the solution to the point where it contains one or two grams per litre of the titanium, calculated as titanium oxide, in the titanous condition.

*Example I.*—Having given 3,680 pounds of the above solution (A), there is prepared a solution of 32.3 pounds of oxalic acid and 2.4 pounds of phosphoric acid in 300 cubic feet of water and the temperature brought to about 98° C. The ilmenite solution (A) is then slowly added to the solution of oxalic and phosphoric acids during the course of one hour. Agitation is continuous and the temperature is maintained about constant. By the time the solutions are thoroughly mixed, about 95% of the titanium will have been precipitated, substantially as a basic sulphate, in an extremely fine state of subdivision, but in such a form that it settles well and may be readily filtered and washed. A part of the phosphoric acid also combines with the titanium and occurs in the precipitate. After filtration or separation by other means from the mother liquor, the precipitate is calcined at a temperature of from 700° C. to 1000° C.

*Example II.*—32.3 pounds of oxalic acid and 2.4 pounds of phosphoric acid are dissolved in 3,680 pounds of the above mentioned solution (A) of ilmenite. 300 cu. ft. of water are brought to a temperature of about 98° C. This solution, containing the oxalic acid and the phosphoric acid, is then slowly added to the water during the course of one hour. Agitation is continuous and the temperature is maintained about constant. By the time the solutions are thoroughly mixed, about 95% of the titanium will have been precipitated, substantially as a basic sulphate, in an extremely fine state of subdivision, but in such a form that it settles well and may be readily filtered and washed. A part of the phosphoric acid also combines with the titanium and occurs in the precipitate. After filtration or separation by other means from the mother liquor, the precipitate is calcined at a temperature of from 700 to 1000° C.

I claim as my invention:

1. In the precipitation of titanium compounds by hydrolysis from a mineral acid solution containing titanium, the step which consists in mixing said titanium solution and a solution of phosphoric acid and an organic acid at an elevated temperature.

2. In the precipitation of titanium compounds by hydrolysis from a mineral acid solution containing titanium, the step which consists in mixing said titanium solution and a solution of phosphoric acid and an organic acid compound at an elevated temperature.

3. In the precipitation of titanium compounds by hydrolysis from a mineral acid solution containing titanium, the step which consists in mixing said titanium solution and a solution of a phosphoric acid compound and an organic acid at an elevated temperature.

4. In the precipitation of titanium compounds by hydrolysis from a mineral acid solution containing titanium, the step which consists in mixing said titanium solution and a solution of a phosphoric acid compound and an organic acid compound at an elevated temperature.

5. In the precipitation of titanium compounds by hydrolysis from a mineral acid solution containing titanium, the step which consists in mixing said titanium solution and a solution containing relatively small amounts of phosphoric acid and oxalic acid at an elevated temperature.

6. In the precipitation of titanium compounds by hydrolysis from a mineral acid solution containing titanium, the step which consists in slowly mixing said titanium solution and a solution of phosphoric acid and an organic acid at an elevated temperature while agitating the mixture.

7. In the precipitation of titanium compounds by hydrolysis from a sulphuric acid solution containing titanium, the step which consists in mixing said titanium solution and a soluton of phosphoric acid and an organic acid at an elevated temperature.

8. In the precipitation of titanium compounds by hydrolysis from a sulphuric acid solution containing titanium, the step which consists in mixing said titanium solution and a solution containing relatively small amounts of phosphoric acid and oxalic acid at an elevated temperature.

9. In the precipitation of titanium compounds by hydrolysis from a sulphuric acid solution containing titanium, the step which consists in mixing said titanium solution and a solution of a phosphoric acid compound and oxalic acid at an elevated temperature.

10. In the preparation of titanium compounds the steps which consist in mixing a mineral acid solution of titanium and a solution of phosphoric acid and an organic acid at an elevated temperature, separating the precipitate formed, and calcining same.

11. In a preparation of titanium compounds the steps which consist in mixing a mineral acid solution of titanium and a solution of phosphoric acid and oxalic acid at an elevated temperature, separating the precipitate formed, and calcining same.

12. In the precipitation of titanium compounds by hydrolysis from a mineral acid solution containing titanium, the step which consists in adding said solution to a dilute solution of phosphoric acid and an organic acid maintained at an elevated temperature.

13. In the precipitation of titanium compounds by hydrolysis from a mineral acid solution containing titanium, the step which consists in adding said solution to a dilute solution of phosphoric acid and an organic acid compound maintained at an elevated temperature.

14. In the precipitation of titanium compounds by hydrolysis from a mineral acid solution containing titanium, the step which consists in adding said solution to a dilute solution of phosphoric acid and oxalic acid maintained at about 98° C.

15. In the precipitation of titanium compounds by hydrolysis from a mineral acid solution containing titanium, the step which consists in slowly adding said solution to a dilute solution of phosphoric acid and an organic acid at an elevated temperature, while agitating the mixture and maintaining the temperature substantially constant.

LONNIE W. RYAN.